US008657037B2

(12) United States Patent
Noiman

(10) Patent No.: US 8,657,037 B2
(45) Date of Patent: Feb. 25, 2014

(54) DRILL BIT AND CORE RETAINING DEVICE

(71) Applicant: Vidik Noiman, Beer Sheva (IL)

(72) Inventor: Vidik Noiman, Beer Sheva (IL)

(*) Notice: Subject to any disclaimer, the term of this patent is extended or adjusted under 35 U.S.C. 154(b) by 0 days.

(21) Appl. No.: 13/754,472

(22) Filed: Jan. 30, 2013

(65) Prior Publication Data
US 2013/0195571 A1  Aug. 1, 2013

Related U.S. Application Data

(63) Continuation of application No. 13/497,508, filed as application No. PCT/IB2009/054118 on Sep. 21, 2009, now abandoned.

(51) Int. Cl.
*E21B 25/00* (2006.01)
(52) U.S. Cl.
USPC .............. 175/249; 175/239; 408/204; 408/67
(58) Field of Classification Search
USPC ......... 175/244, 245, 248, 403, 236, 239, 253, 175/249; 166/162; 408/67, 204
See application file for complete search history.

(56) References Cited

U.S. PATENT DOCUMENTS

| 6,881,016 B2 | 4/2005 | May |
| 7,484,578 B2 | 2/2009 | Duncan |
| 2004/0191014 A1 | 9/2004 | May |

FOREIGN PATENT DOCUMENTS

| JP | 7171821 | 7/1995 |
| JP | 11320548 | 11/1999 |

*Primary Examiner* — Yong-Suk (Philip) Ro
(74) *Attorney, Agent, or Firm* — Holtz, Holtz, Goodman & Chick

(57) ABSTRACT

A core retaining device is provided for use with a core drill bit, which is adapted to cut a core from a material such as concrete. The core retaining device includes a core attachment mechanism for releasably connecting the core retaining device to the core. A bearing is connected to the core attachment mechanism and allows the drill bit to rotate while the core attachment mechanism remains statically connected to the core. A biasing arrangement operably connects between the drill bit and the core via the bearing, and axially biases the core away from the material preventing the core from slipping from the drill bit. The core retaining device further includes at least one auxiliary safety feature such as extensions which extend laterally outward from the drill bit.

10 Claims, 7 Drawing Sheets

DRILL BIT AND CORE RETAINING DEVICE

CROSS REFERENCE TO RELATED APPLICATIONS

This application is a continuation-in-part of U.S. patent application Ser. No. 13/497,508, filed Mar. 21, 2012, which claimed priority to PCT/IB2009/054118 having an international filing date of Sep. 21, 2009 and claiming priority from Israel Patent Application No. 194225 filed on Sep. 21, 2008.

FIELD OF THE INVENTION

The present invention relates to a construction tools, in particular a drill bit for retaining a core drilled from a material and a core retaining device.

BACKGROUND OF THE INVENTION

In many construction situations there is a need to drill a hole in a material, e.g. concrete from a floor or wall. A core drill bit, also referred to as a circular drill bit or hole-saw, is commonly used for such purpose. The drilling process results in a concrete core being separated from the material, which can fall from the drill bit and cause damage or injury.

JP 11320548 (Suetsugi) discloses a concrete drop prevention device or concrete safety catcher for a core drill. The concrete safety catcher is adapted to hang the concrete by a connecting mechanism and a concrete anchor after drilling of the concrete to prevent the concrete from falling. The anchor is arranged in the core bit to act as the concrete safety catcher when the core drill drills a cylindrical hole through the concrete. The connecting mechanism is arranged in the core bit and connects an upper wall and the concrete anchor of the core bit.

JP 7171821 (Onishi, et al.) discloses a take-up device independent of rotation of a drill to eliminate the twist and break of a string belt by a method wherein a fixed base part is provided in a closed-end cylindrical drill. The take-up device is disposed downward of the fixed base part, which is connected to the take-up device by a rotating shaft, and the take-up device is rotated on ball bearings.

U.S. Pat. No. 7,484,578 (Duncan) discloses an apparatus for drilling holes in a substrate wherein a mandrel is anchored to the substrate. A hollow drill bit rotates about the mandrel via a drive motor and is a guided along a length of the mandrel.

U.S. Pat. No. 6,881,016 and U.S. 2004/191,014 (May) disclose a core retainer having a base plate releasably attached to a concrete floor from which a concrete core is to be removed. A brake assembly atop the plate includes a plurality of brake pads for contact with the interior of the core drill bit. The retainer is configured to fit within the core drill bit and either rotate with the core drill bit or be stationary relative thereto. Upon drilling, the plate and separated core fall toward the floor below. This movement is translated to the brake assembly by the linkage such that the brake pads engage the inner circular wall of the core drill bit at a sufficient pressure allowing for the separated core to be retained within the core drill bit.

SUMMARY OF THE INVENTION

According to one aspect, the present invention provides an improved core retaining device for use with a core drill bit. The core drill bit is adapted for cutting a core from a material and comprises a proximal cutting portion and a distal portion. The core retaining device comprises: a core attachment mechanism for releasably connecting the core retaining device to the core of the material; a bearing connected to the core attachment mechanism allowing the drill bit to rotate while the core attachment mechanism remains statically connected to the core; and a biasing arrangement operably connecting between the drill bit and the core via the bearing, axially biasing the core in the direction of the distal portion of the drill bit.

It should be understood that when terms such as connected, connecting, attached, attaching, fastened, fastening and the like are used herein the specification and claims, it is meant to denote either of a direct or indirect connection, etc. I.e. there may be one or more intermediate components, without deviating from the intention of the term connected, etc.

In some embodiments, the device further comprises at least a pair of extensions extending essentially laterally outboard from the drill bit.

In some embodiments, the core attachment mechanism comprises an attachment plate.

According to another aspect, the present invention provides an improved core drill bit comprising: a proximal cutting portion; a distal portion comprising at least a pair of apertures; and the core retaining device as defined above.

BRIEF DESCRIPTION OF THE DRAWINGS

The invention may be more clearly understood upon reading of the following detailed description of non-limiting exemplary embodiments thereof, with reference to the following drawings, in which:

FIGS. 4-6 are schematic views illustrating yet another embodiment of the present invention, wherein FIGS. 4 and 5 are front and side sectional views, respectively; and FIG. 6 is an isometric view of a portion of a biasing arrangement of the embodiment; FIG. 7 is a schematic side sectional view and FIG. 8 is a view in the AA direction indicated in FIG. 7.

The figures are intended to aid in understanding the invention and components illustrated therein may not necessarily be drawn to scale.

DETAILED DESCRIPTION OF THE INVENTION

In many instances, the same reference numbers may be used for similar components, despite modifications thereto, in the various embodiments described below. For the sake of brevity, description details of certain components which are known in the art are omitted.

Figure 1:
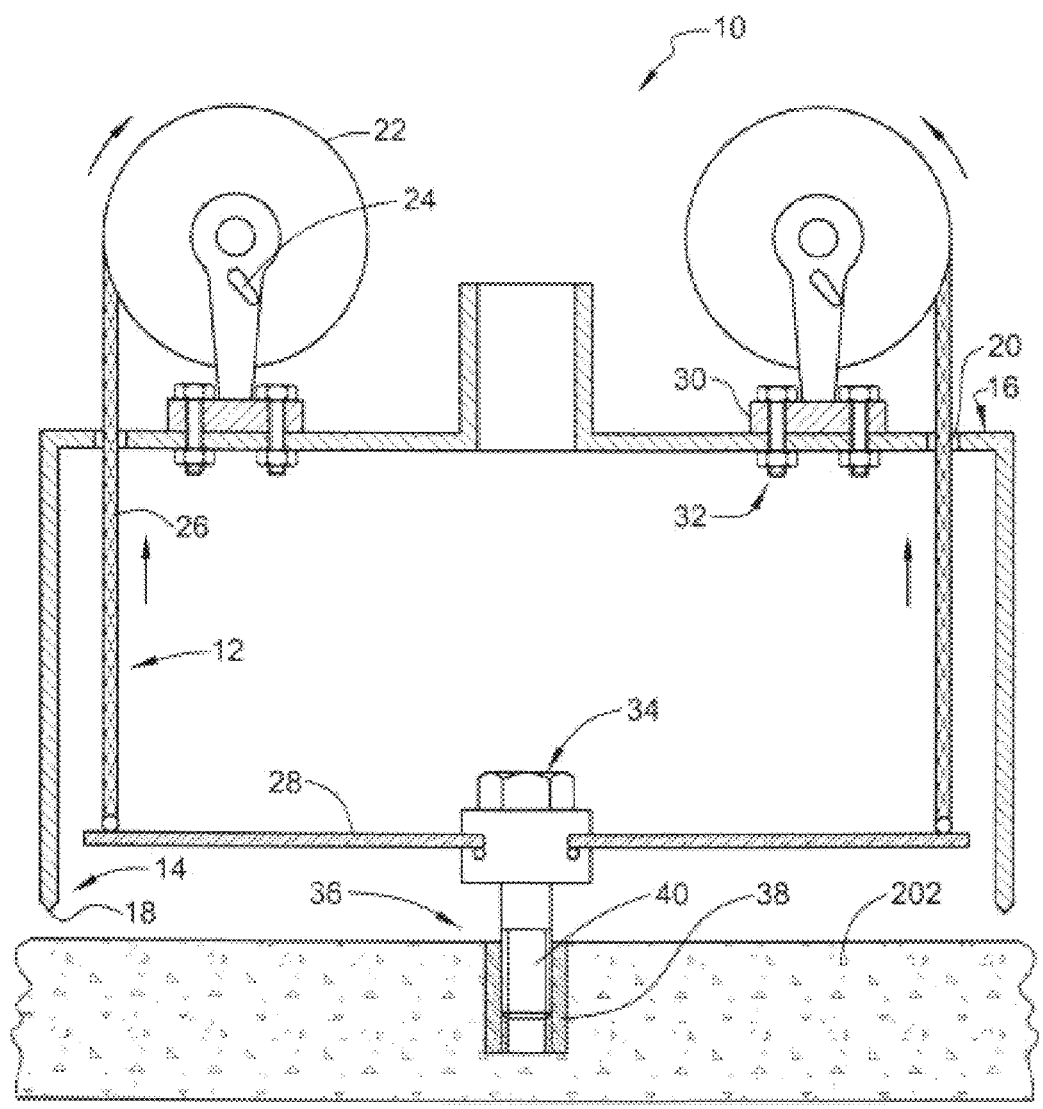
FIG. 1 is a schematic side sectional view of an embodiment of a core retaining device and core drill bit of the present invention.
Figure 2:
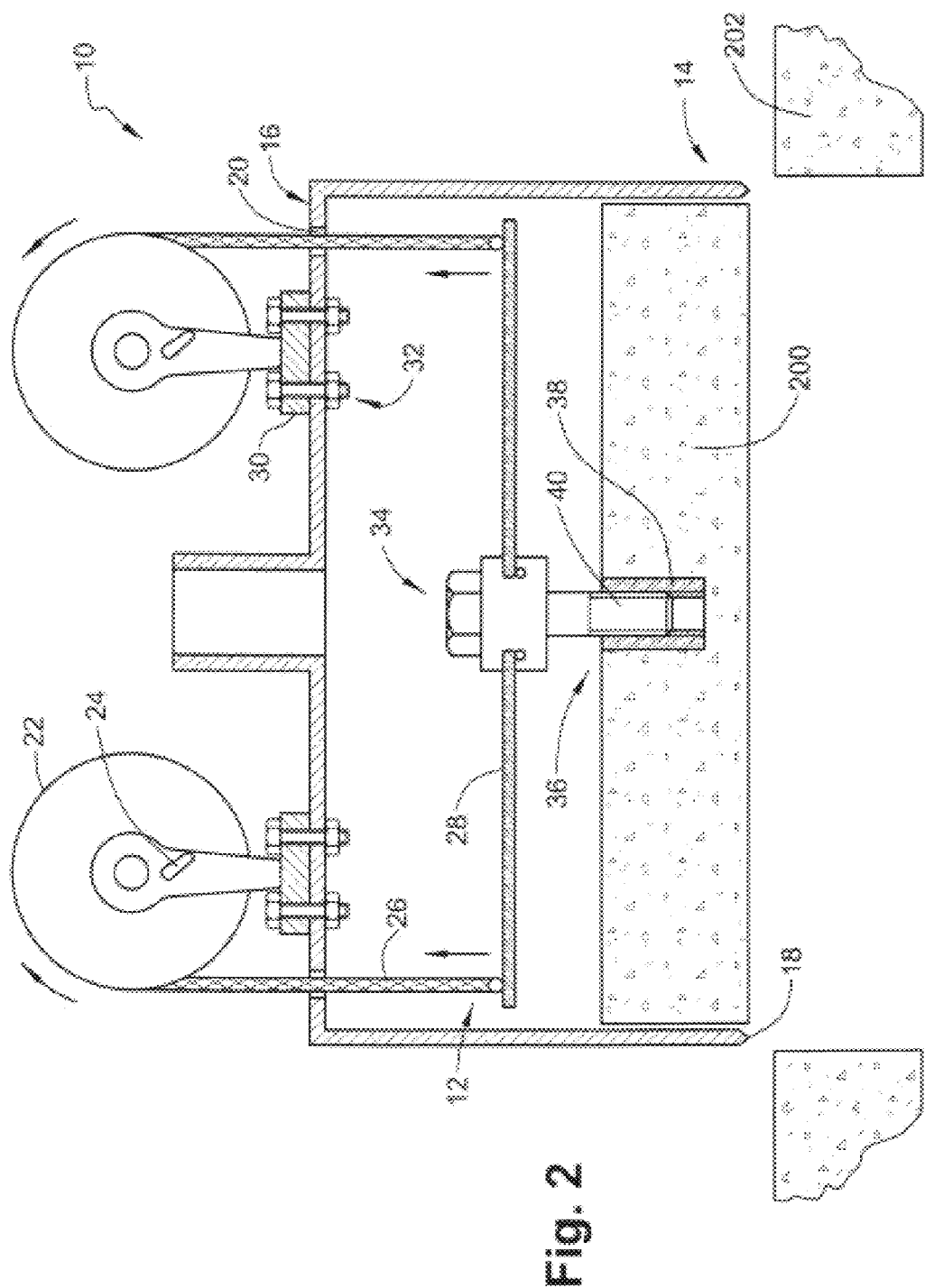
FIG. 2 is a schematic side sectional view of the embodiment of FIG. 1 showing the device and bit after a core material has been cut.

FIGS. 1 and 2 show an embodiment of a core retaining drill bit 10 comprising a core retaining device 12 for cutting a core 200 (FIG. 2) from a material 202 (e.g. concrete). Drill bit 10 is of a generally typical hole-saw configuration and comprises a proximal portion 14 and a distal portion 16. Proximal portion 14 comprises at least one cutting tooth, and typically a plurality of cutting teeth 18. Optionally or alternatively drill bit 10 comprises a cutting edge made up of, for example, numerous very small diamonds (not shown). Distal portion 16 comprises a pair of apertures 20.

Core retaining device 12 comprises a biasing arrangement including a pair of spools 22 mounted on distal portion 16, each spool adjacent to one of apertures 20. Each spool 22 comprises a spring-loaded ratchet mechanism (not seen) with a setting lever 24 to set the ratchet mechanism in a ratcheting or release position.

Core retaining device 12 further comprises a pair of cables 26 and a plate or elongated member 28 dimensioned to fit within the confines of drill bit 10 and disposed therein. One end of each of cables 26 is fastened or attached to one of spools 22 and the other end of each of the cable is attached or fastened to elongated member 28, typically at or close to the ends of the member. The spring loaded ratchet mechanisms associated with spools 22 are designed to upwardly bias cables 26.

Each spool 22 typically comprises a base 30 whereat the spools are fastened or attached to distal portion 16 of drill bit 10, for example, by a bolt/nut set 32 or any other appropriate fastening/attachment means (e.g. rivets, welding, etc). According to some embodiments, core retaining device 12 comprises more than two spools 22, two cables 26, etc, for example, spaced apart in a circular pattern on top of distal portion 16 of drill bit 10.

Core retaining device 12 also comprises a bearing 34 disposed at the center of elongated member 28. Bearing 34 is attached to a core attachment mechanism 36 comprising, for example, an anchor 38 and a bolt 40 adapted to fasten to core 200 of material 202. The number of attachment mechanisms 36 (and/or their size or design) depends on the size (weight) of core 200 and in the embodiment illustrated in FIGS. 1 and 2 there is one attachment mechanism. Bearing 34, which will not be described in further detail as such bearings are known, allows elongated member 28 to spin along with drill bit 10, when operated, relative to attachment mechanism 36, which is static with core 200.

Figure 3:
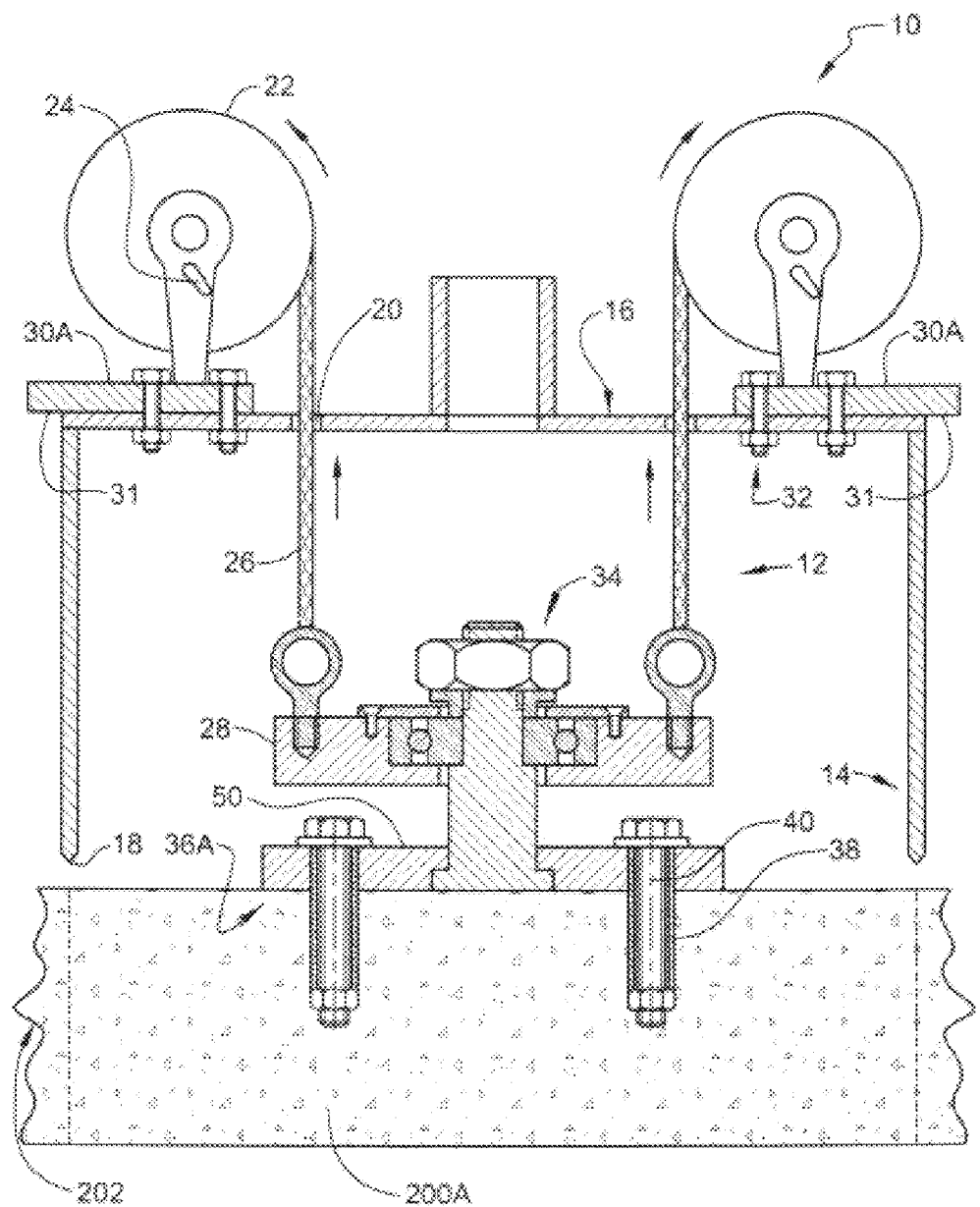
FIG. 3 is a schematic side sectional view of another embodiment of the present invention.

FIG. 3 shows a further embodiment of the invention wherein there is a core attachment mechanism, now designated 36a, which is designed for a relatively larger sized core 200a than core 200. Core attachment mechanism 36a comprises an attachment plate 50 which is attached to bearing 34 and also to core 200a, respectively. Attachment plate 50 can be in a variety of configurations, but typically in the form of a strip or a disk.

To attach/fasten attachment plate 50 to core 200a there are a plurality of anchors 38 and bolts 40; a set of two are illustrated. If core 200a is large (heavy) enough to warrant it, according to particular embodiments, core attachment mechanism 36a comprises additional anchors 38 and bolts 40 which may be disposed juxtaposed linearly, in particular attachment plate 50 is in the form of a strip. On the other hand, if attachment plate 50 is disk shaped, anchors 38 and bolts 40 may be disposed in a circular pattern.

According to some embodiments, also illustrated in FIG. 3, the base, now designated 30a, comprises an extension 31 extending laterally out beyond bit 10. Extension 31 serves a safety backup purpose in case the drill bit detaches and falls from the drill (not seen), or the drill falls. In such a case the bit and core retainer would be held by the base's extension 31 which would have fallen.

Operation:

With cables 26 suitably unwound from spools 22, core attachment mechanism 32 is attached/fastened to core 200, 200a so that elongated member 28 is above the center point of the core. Upon cutting, drill bit 10 will spin into the material 202 and surround core 200, 200a. This action would have a tendency to provide slack to cables 26, however the bias of the ratchet mechanism takes up this slack and the cables wind up on their respective spools 22, preventing core 200 from potentially slipping out of drill bit 10 (see FIG. 2).

Although attachment mechanism 36, which attaches core retaining device 12 to material 202 (and what will become core 200, 200a), need remain static with the core, due to bearing 34, spools 22, cables 26 and elongated member 28 are free to spin along with drill bit 10 during cutting.

When core 200, 200a has been completely removed from material 202, the drill (not shown), along with bit 10 and core 200, 200a can be distanced from the opening left by the removed core, at which point core retaining device 12 can be released from the core by removing core attachment mechanism 36, 36a.

Figure 4:
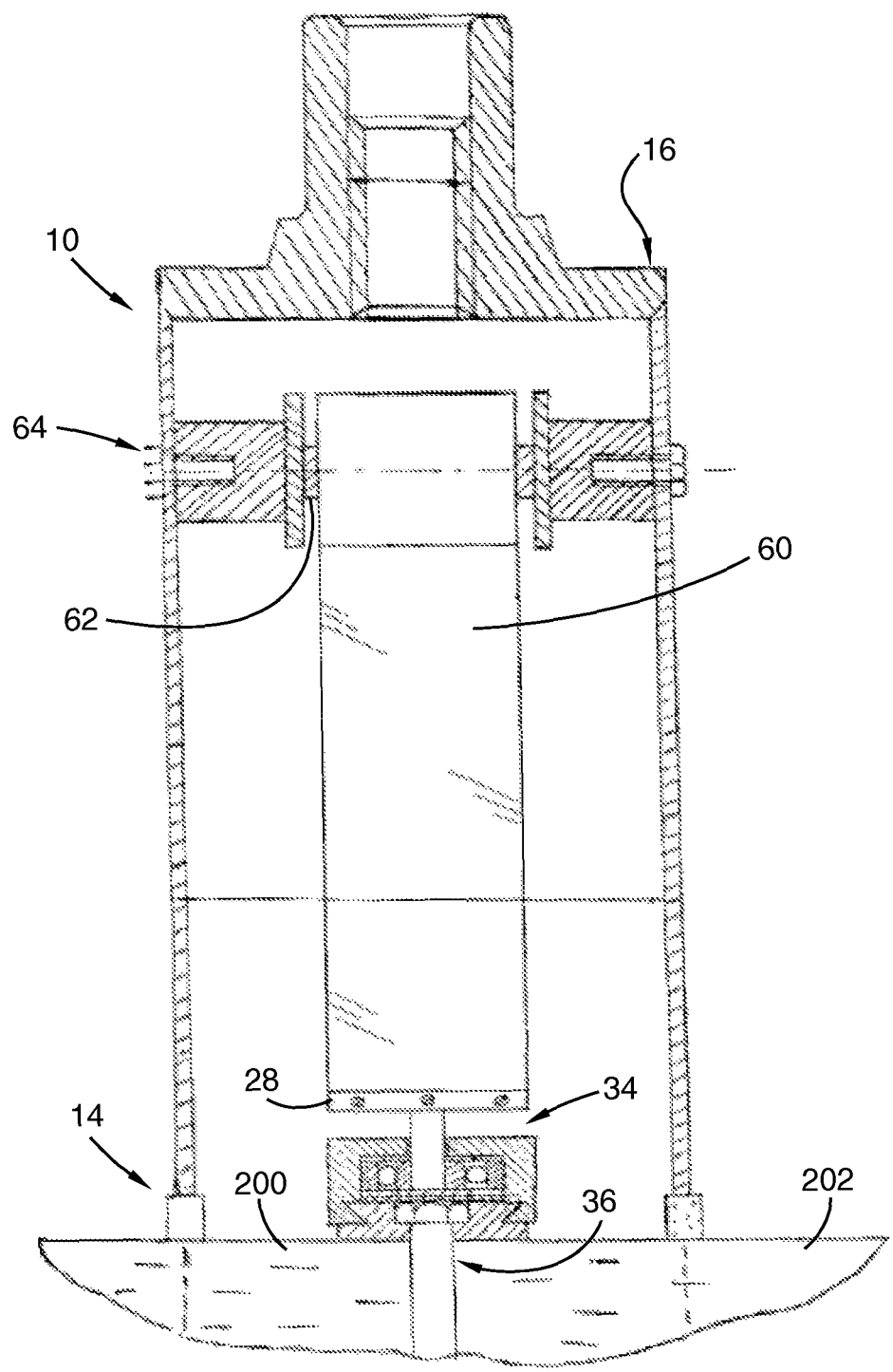
Figure 5:
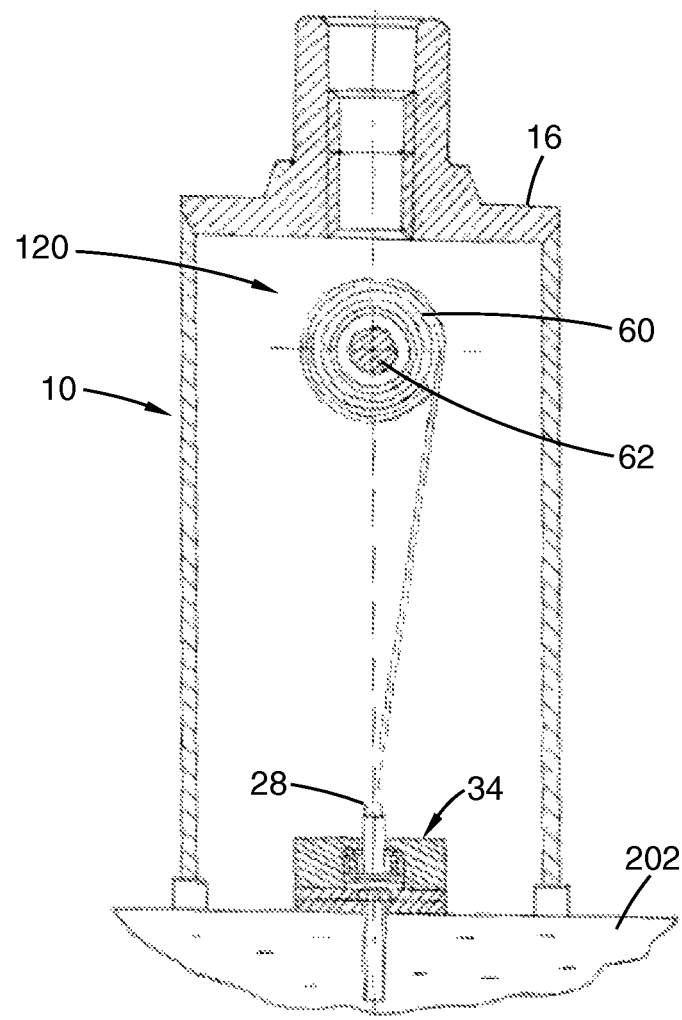
Figure 6:
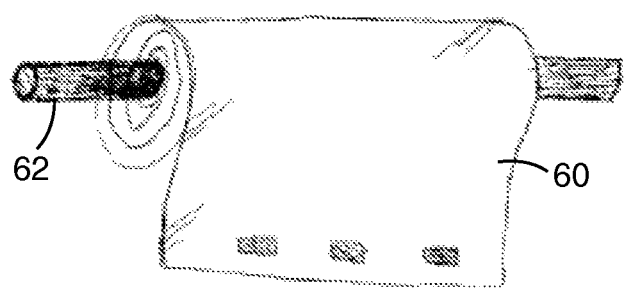

FIGS. 4-6 show a further exemplary embodiment of the invention wherein the biasing arrangement is disposed within the confines of drill bit 10. Similarly to the above embodiments, the biasing arrangement operably connects between the drill bit and core 200 via bearing 34. The biasing arrangement includes a windable connection element such as a coilable flat sheet 60 (although other such elements could be used, for example one or more cables). Coilable flat sheet 60 is wound on a rod 62 which is biased to rotate so as to tend to pull core 200 in the direction of distal portion 16 of drill bit 10 (i.e. biasing the core away from the material 202). Such biasing is typically constituted, for example, by a spring (not shown). Coilable flat sheet 60 is attached to member 28, however, it should be understood that, as with the aforementioned embodiments, bearing 34 could be connected to the sheet (or cables 26) by various means, or even directly connected. Rod 62 is attached to drill bit 10 by a fastening element 64. The effect of the biasing is similar to the result illustrated in FIG. 2.

Without intention to limit, the embodiment shown in FIGS. 4-6 is typically suited to cores smaller than those, for example, than the embodiment shown in FIG. 3 is suited.

Operation of the drill bit 10 is similar to as described above. Upon cutting, drill bit 10 will spin into the material 202 and surround core 200. This action would have a tendency to provide slack to the windable connection element (e.g. sheet 60), however the bias imposed on rod 62 takes up this slack and the windable connection element winds up on the rod, preventing core 200 from potentially slipping out of drill bit 10.

Figure 7:
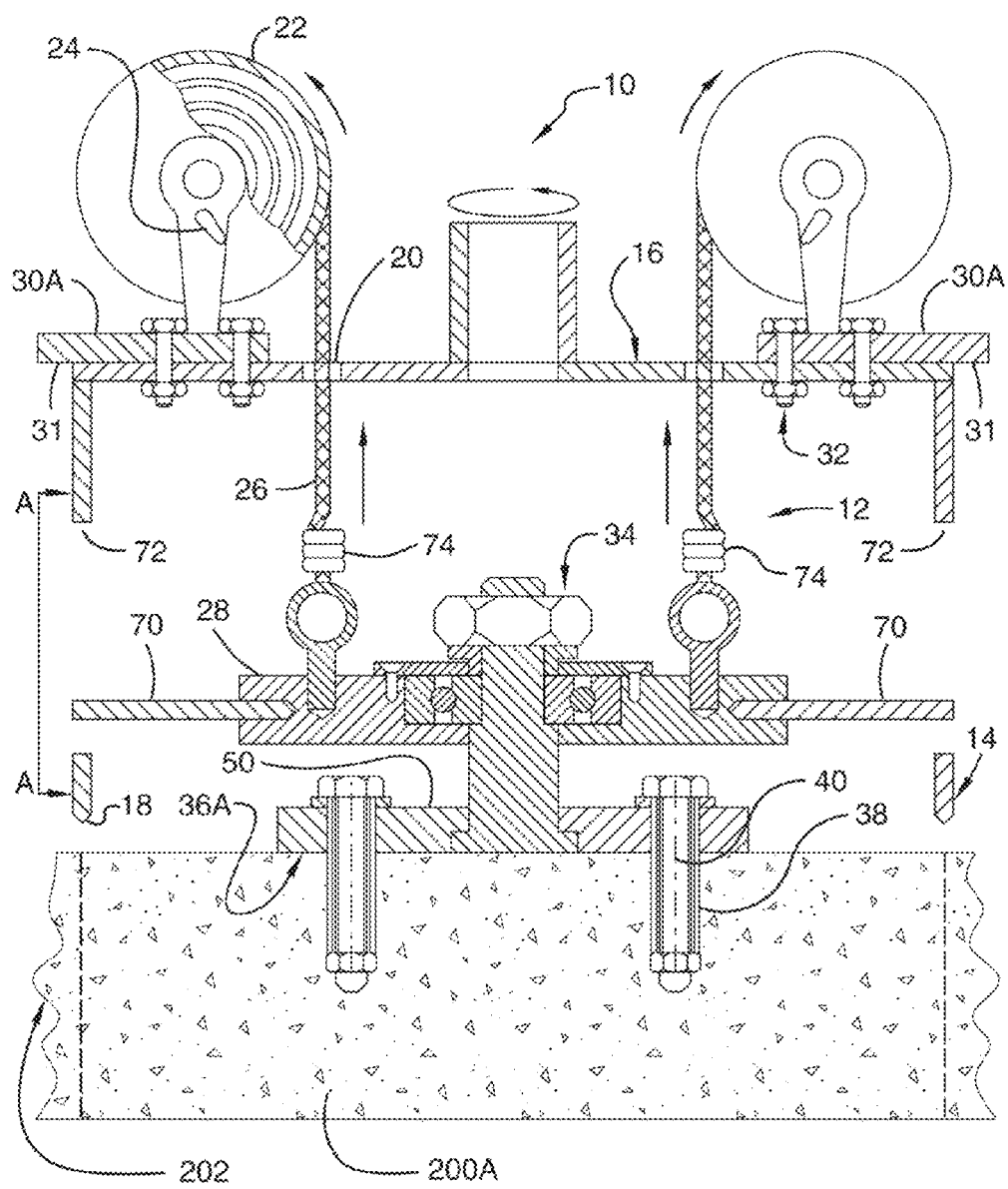
FIGS. 7 and 8 illustrate further embodiments where
Figure 8:
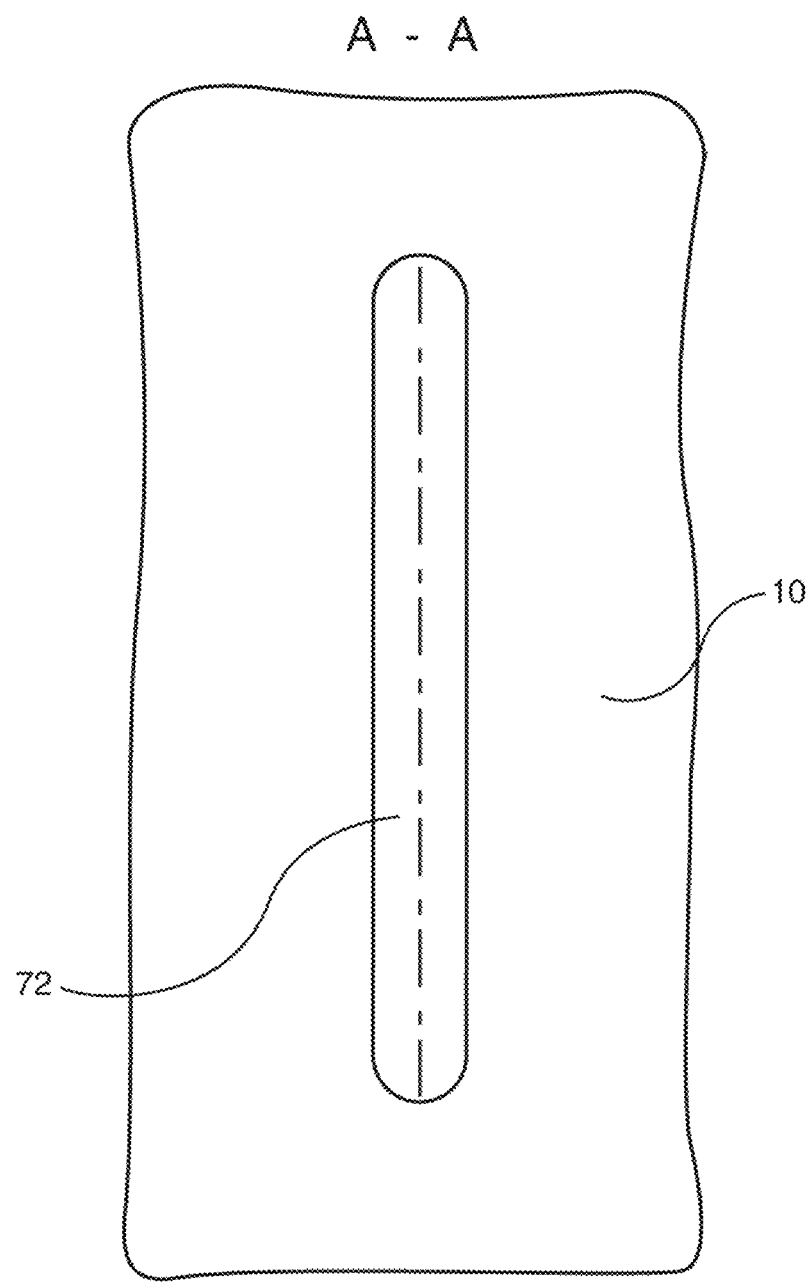

FIGS. 7 and 8 show additional embodiments illustrating an auxiliary safety feature in the form of a pair of generally horizontally elongated member extensions 70 extending from the sides of elongated member 28 and extending into two respective vertical slots 72 in drill bit 10. Elongated member extensions 70 but do not extend beyond the periphery of bit 10 and core 200. In the case of a cable failure, extensions 70 will catch at the the bottom of slots 72 preventing core 220a from falling, thereby providing an auxiliary safety backup feature. Extensions 70 provide another extremely important function, namely, preventing the twisting of cables 26.

FIG. 7 further shows a drilling convenience feature in the form of a pair of spring portions 74 "embedded" in cables 26. It may occur that during drilling, drill bit 10 will get caught or stuck in material 202 (concrete) or the drilling motor rpm will slow. Such phenomena are particularly common if the concrete has reinforcing bars (not shown). Spring portions 74 can be used to circumvent the ratchet mechanism and provide some "play" (typically of a few millimeters are required) whereby bit 10 can be raised and freed from the concrete. After that, cutting can resume.

It should be understood that the above description is merely exemplary and that there are various embodiments of the present invention that may be devised, mutatis mutandis, and that the features described in the above-described embodiments may be used separately or in any suitable combination.

What is claimed is:

1. A core retaining device for use with a core drill bit for cutting a core from a material and comprising a proximal cutting portion and a distal portion, the core retaining device comprising:
    a core attachment mechanism for releasably connecting the core retaining device to said core of said material;
    a bearing which is connected to said core attachment mechanism and which is adapted to allow the drill bit to rotate while said core attachment mechanism remains statically connected to the core;
    a biasing arrangement which is adapted to operably connect between the drill bit and the core via said bearing, and to axially bias the core in a direction of said distal portion of the drill bit; and
    a plurality of extensions which extend laterally outward from a top portion of the drill bit and which are adapted to extend laterally outward beyond the drill bit.

2. The device according to claim 1, further comprising a pair of elongated member extensions which are arranged to respectively extend through a pair of vertical slots in the drill bit.

3. The device according to claim 1, wherein the biasing arrangement comprises:
    at least two biased ratcheting mechanisms which are adapted to be disposed on said distal portion of the drill bit;
    a member which is adapted to be disposed within the drill bit and which is attached to the bearing and the core attachment mechanism; and
    respective cables for each ratcheting mechanism, the respective cables operably connecting between each ratcheting mechanism and said member, and wherein the cables are arranged to pass through apertures in the distal portion of the drill bit.

4. The device according to claim 3, wherein each cable includes a spring portion for releasing the drill bit from the material.

5. The device according to claim 1, wherein the biasing arrangement comprises a biasing device adapted to be disposed within the drill bit and to operably connect between the drill bit and the core via the bearing.

6. The device according to claim 1, wherein the core attachment mechanism comprises an attachment plate.

7. The core drill bit for cutting a core in a material according to claim 1, the core drill bit comprising:
    a proximal cutting portion;
    a distal portion; and
    the core retaining device as defined in claim 1.

8. The core drill bit according to claim 7, further comprising:
    a pair of vertical slots,
    wherein the core retaining device further comprises a pair of elongated member extensions which respectively extend through the pair of vertical slots in the drill bit.

9. The device according to claim 3, further comprising a pair of elongated member extensions which are arranged to respectively extend from said member through a pair of vertical slots in the drill bit.

10. A core retaining device for use with a core drill bit for cutting a core from a material and comprising a proximal cutting portion and a distal portion, the core retaining device comprising:
    a core attachment mechanism for releasably connecting the core retaining device to said core of said material;
    a bearing which is connected to said core attachment mechanism and which is adapted to allow the drill bit to rotate while said core attachment mechanism remains statically connected to the core;
    a biasing arrangement which is adapted to operably connect between the drill bit and the core via said bearing, and which axially biases the core in a direction of said distal portion of the drill bit; and
    a pair of elongated member extensions which are arranged to respectively extend through a pair of vertical slots in the drill bit.

* * * * *